Patented Sept. 10, 1940

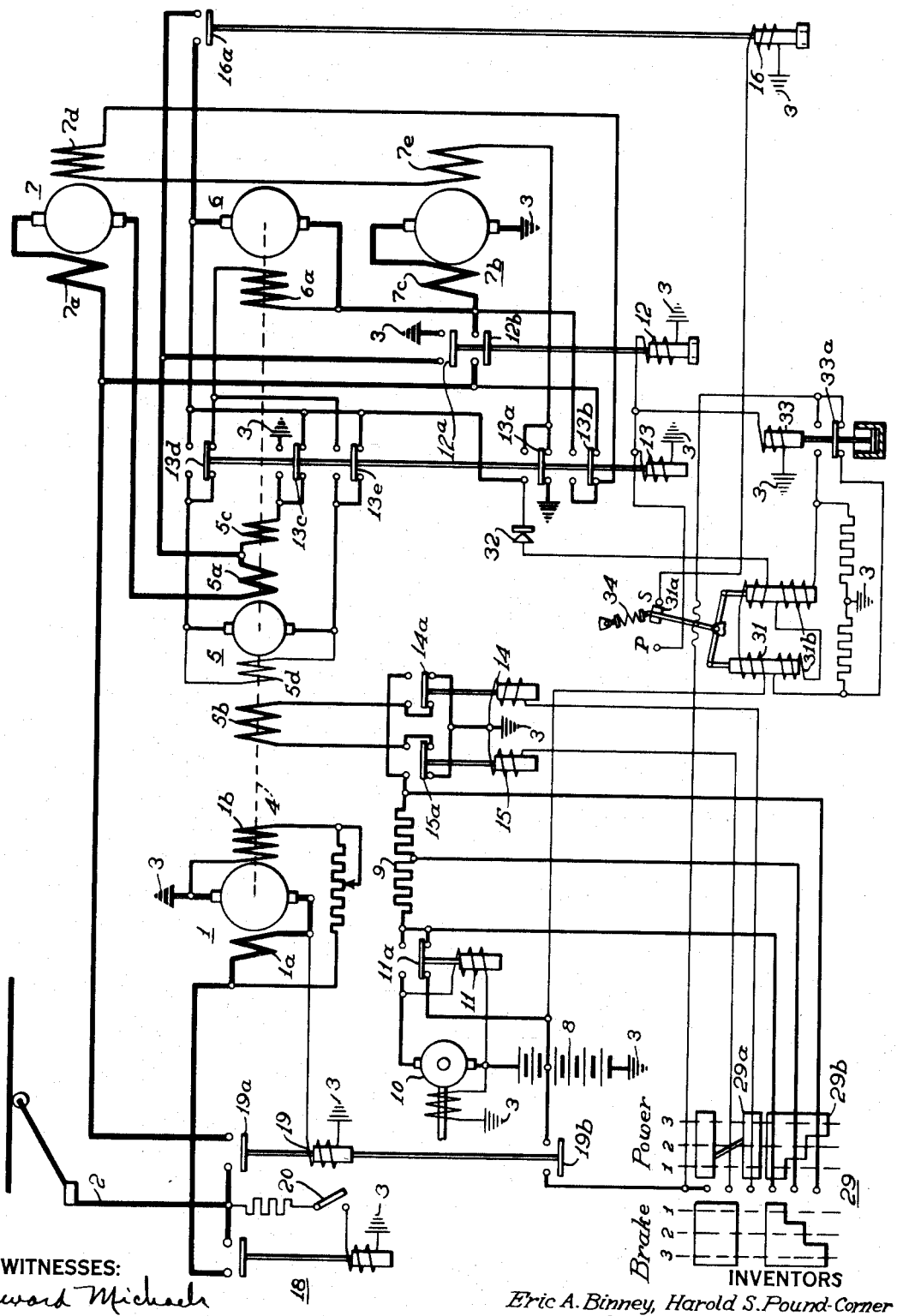

2,214,605

UNITED STATES PATENT OFFICE 2,214,605

ELECTRIC MOTOR CONTROL SYSTEM

Eric Alton Binney, Ilkley, and Harold Sinclair Pound-Corner and Hugh Brougham Sedgfield, Bradford, England, assignors to The English Electric Company, Limited, London, England, a company of Great Britain Application September 7, 1939, Serial No. 293,685
In Great Britain September 8, 1938

12 Claims. (Cl. 172—179)

This invention relates to electric power equipment in which a Ward-Leonard or a booster set is adapted to draw electric energy from an external power supply and to supply or to buck or boost the supply to a direct current motor to accelerate the motor. The invention furthermore relates to particular equipment of this kind including transfer switches by means of which the load formed by the motor armature can be transferred wholly to the said power supply. Certain arrangements of this kind are described in the specification of the copending application of C. E. Baston and E. A. Binney, Serial No. 157,655, filed August 6, 1937.

An object of the present invention is to provide for the complete automatic control of traction motors, both on power and regeneration.

Another object of this invention is to provide a motor control system in which no changes are made to the power connections in transferring from power to regenerative braking.

A further object of the invention is to provide a motor control system which will maintain substantially constant current over a wide range of operation.

Other objects will be explained fully hereinafter or will be apparent to those skilled in the art.

The invention consists in controlling the transfer switches by means responsive to some electrical condition of the circuit of the working motor such as the potential difference between two points in the circuit. Transference is thus dependent on the electromotive force of the generator or booster or on the back electromotive force of the working motor. In particular, where transference is effected by closure of switches between points which have first been brought to substantially the same potential, the control means respond to a condition of substantially no difference in potential between the said points. The transfer may be entirely automatic, under the sole control of the said control means and the latter may also control retransference of the load back to the generator or booster.

The invention furthermore comprises various automatic control and protective features for a complete equipment of the kind referred to. Such features will appear from the following description of one particular form of buck and boost control equipment for electric traction motors, as shown in the accompanying drawing.

In the single figure showing one particular complete system for the control of two direct current electric traction motors or two groups of motors on the buck and boost system and incorporating the present invention, the booster set comprises three machines, viz: (a) the compound-wound machine 1 connected between the supply lead 2 and the common earth connection 3, (b) the exciter 5, and (c) the booster 6, all on the common shaft 4. The machine 1 has a series field winding 1a and a shunt field winding 1b. The booster 6 has a shunt field winding 6a in series with which is the armature of the exciter 5. The booster armature can be connected in series with and between the two traction motors 7 and 7b by closure of contactor 16a. These motors have series field windings 7a and 7c and also field windings 7d and 7e which can be connected across the power supply between 2 and 3.

The exciter 5 has at least two field windings 5a and 5b. Winding 5a is always in series with the traction motor 7 and carries this motor current or a shunted part thereof. Winding 5b is a biasing winding which is opposed by 5a and is shown as supplied by the battery 8 through the resistor 9.

The booster set can be started by closing in sequence a series of contactors 18 and 19 which connect machine 1—for use as the driving motor—to the supply line 2. On closure by the driver of a starting switch 20 the contactor 18 is closed. As the motor 1 accelerates, the contactor 19, connected in shunt to the armature of machine 1 and responding to the increase in motor back electromotive force with increase of speed, is closed to connect the traction motors and the booster to the power conductor 2.

In addition to the previously mentioned contactor 16a there are provided transfer contactors 12a and 12b, by closure of which the traction motors 7 and 7b can be connected in parallel with each other across the power supply. The operation of transfer contactors 12a and 12b is automatically controlled, as explained hereinafter, by the means forming the primary feature of the invention. Initially, and during the starting-up of the booster set, the contactors 12, 12a and 16a are open and the reversing switches 14a and 15a for the exciter field winding 5b are in the position shown, whereby this winding is unenergized. Switches 13a and 13b connect the motor field windings 7d and 7e across the power supply.

Movement of the driver's controller 20 to a power position makes a circuit from the positive terminal of an auxiliary supply—which may be the battery 8—by way of contact 19b and 20a through the operating coil 14 to earth, whereupon switch 14a is operated to connect one end of the exciter field winding 5b to the battery 8 to energize this winding. Another control circuit is made through the contacts 19b on the contactor 19, the contacts 31a of an automatic control relay and the operating coil 16 whereupon contactor 16a closes to connect the motors and booster in series across the power supply. The operating coils 31 of the automatic control relay are connected in series with some form of rectifying valve 32 between a positive point on the battery 8 and that contact of the contactor 16a which is connected to the booster armature. Reversible polarizing coils 31b for the control relay are connected to the auxiliary supply through the reversing switch 33.

The current through the booster and motor armatures is determined by the exciter 5 in the circuit of the booster field winding 5a. The resistance in this circuit is so adjusted that the booster is substantially self-exciting and the exciter, therefore, has little work to do. The exciter always influences the booster voltage in such a way as to tend to reduce the exciter voltage to zero, i. e., it tends to maintain such a traction motor current that the excitation produced by the field winding 5a on the exciter substantially balances that produced by any other field windings thereon. The exciter may include a shunt field winding 5d. It is also shown as having a field winding 5c connected by switch 13c across the contacts of contactor 16a. Before the closure of contactor 16a the current in field winding 5a is negligible. Since winding 5b is also unenergized, the exciter tends to maintain a condition of substantially no current in winding 5c. Thus the booster electromotive force tends to keep steadily equal and opposite to the electromotive force of the power supply. Closure of contactor 16a short-circuits winding 5c, but winding 5b is immediately energized and the booster electromotive force falls until there passes through the winding 5a a current which just balances the action of winding 5b. The motors are then automatically accelerated at this current. The driver's controller 29 may include means 29b for varying the resistance 9 and determining the motor current. As the back electromotive force of motors 7 and 7b increases, the electromotive force of the booster decreases steadily to zero, reverses, and then increases until it is equal to the supply voltage. When this condition is reached, there is no appreciable potential difference across the contacts of either of the transfer switches 12a and 12b and they can be closed without causing disturbance.

One end of the circuit of the control relay coil 31 is always at a small positive potential with respect to earth, as determined by the battery 8. The other end is at a continuously changing potential which, when contactor 16a first closes, is substantially that of the supply lead 2. The valve 32 at first, however, prevents any appreciable current from passing through the coil 31 to earth. The potential of this same point falls as the bucking electromotive force of the booster decreases, continues to fall, until the booster electromotive force has reversed and is assisting the supply voltage, and becomes substantially earth potential when the booster electromotive force is equal to the supply voltage. The battery can then send sufficient current through the valve 32 and the coil 31 to operate the control relay and change over the switch 31a against the biasing spring 34. Certain types of rectifying value—such as the static contact type employing conducting plates separated by unidirectionally conductive layers—have such considerable resistance in their conductive direction that the use of one of these as the valve 32 necessitates considerable reverse potential to operate the relay 31. The application of biasing voltage by the battery 8 overcomes this difficulty and allows of adjustment so that the relay will operate at any desired small difference of potential between the booster terminal and earth.

The throwing over of contacts 31a energizes first the coil 12 for closing the contactors 12a and 12b immediately, and second, the coil 33 for throwing over the contacts 33a—after a time delay—for reversing the polarizing coil 31b of the control relay. The same action of contacts 31a deenergizes the coil 16 whereby, after the closure of contactors 12a and 12b, the contactor 16a opens. Three other sets of switching means, viz, 13a, 13b, 13c, 13d and 13e, operate with the contacts 33a and may be actuated by the same coil. The motors 7 and 7b are now connected in parallel across the power supply while the circuit from the supply through the booster is interrupted by contactor 16a. The motor field coils 7d and 7e are connected across the booster by the movement of switches 13 and 13a while the exciter armature connections are reversed by the switches 13d and 13e. The exciter field winding 5a remains in series with motor 7 while the winding 5c, now connected in parallel with contactor 12a by the throwing-over of switch 13c, is short-circuited by contactor 12a and remains unenergized. Thus the booster, by its action on the excitation of the traction motors, continues to influence the motors and tend to maintain a predetermined motor current.

The control relay is such that the passage of a certain minimum current through the coil 31 in an invariable direction determined by the valve 32 tends to throw over the contacts 31a in one direction or the other as determined by the direction of current through the polarized coil 31b. The spring 34 retains the contact arm in either position until overcome by the joint action of an operating coil and a polarizing coil. The coil 31 is now connected across the open contacts of contactor 16a, just as it was previously across the open contacts of contactor 12a when the latter was open and the former closed, and again the potential difference is in such a sense that the valve 32 prevents the passage of any appreciable current. Should the changing booster electromotive force at any time bring the potential difference back to the value that it had at the moment when transfer was initiated, the battery will send current through the coil 31 in the same direction as before. The coil 31b being, however, reversed by contacts 33 this current impulse will cause the contacts 31a to move back to their original position, energizing coil 16 to reclose contactor 16a, while deenergizing coils 12 and 33 to open contactors 12b and 12a and otherwise to restore the original conditions of series connection of motors and booster. Since transient conditions following transfer or retransfer may cause a flow of appreciable current through the operating coil 31 immediately after the throwing over of the relay and the reversal of the polarizing coil 31b, which would lead to the relay being thrown back again, and so on, contacts 33a act with a time-lag. Any form of time delay device, such as a dashpot, as shown, or other suitable time delay mechanism, may be used. It will be seen that coil 31 is across contactor 12a when that contactor is open and so controls its closure in accordance with the condition of substantially zero potential difference across it. Similarly, the coil is across contactor 16a when that is open.

In order to ensure that 12a and 12b close before 16a opens and that 16a recloses before 12a and 12b open, the solenoids which operate these switches may be of the retarded type, as shown. If desired, the same result may be accomplished in a well-known manner by so interlocking the switches 12a, 12b and 16a that 16a cannot open until 12a and 12b have closed and 12a and 12b cannot open until 16a has closed.

The system herein described may be used to maintain substantially constant current over a wide range. If desired, an axle driven machine 10 may be included and used to vary the excitation of field windings 7d and 7e inversely as vehicle speed. A switch 11a for switching machine 10 into the circuit of field winding 5b and simultaneously, to compensate for the electromotive force of machine 10, varying the number of cells of battery 8 in circuit, may be operated under the control of the driver or in automatic response to vehicle speed. Thus, for example, a relay 11 connected across the armature of machine 10 may be adapted to pick up at a certain predetermined voltage, i. e., at a certain predetermined vehicle speed, and actuate switch 11a. When the transfer contactors 12a and 12b close and contactor 16a opens, and the booster is merely supplying field windings 7d and 7e, any further increase of vehicle speed, by acting on the excitation of the machine 10 on the booster through the action of the machine 10 on the exciter, causes the excitation of the traction motors to decrease and vice versa.

Coasting may be brought about at any time by reducing the current in the biasing field winding 5b of the exciter substantially to zero whereby the exciter will tend to maintain zero current in the traction motor armature circuit, either directly, when motors and booster are in series, or indirectly by tending to so excite the motors that no motor armature current flows when the motor armatures are in parallel across the supply. If coasting be introduced under the latter conditions, the control relay will still function as described to cause retransfer in response to changes in the booster electromotive force. Power or regenerative braking conditions can be smoothly introduced at any time by altering the biasing of the exciter, the transition being undisturbed by fluctuations in supply voltage.

Regenerative braking may be introduced at any time by moving driver's controller 29 to a brake position. The axle-driven machine 10 may be used to control regenerative braking in accordance with speed down to that speed at which the above-mentioned relay drops out or alternatively the axle-driven machine may be put out of circuit by the driver's controller during regenerative braking if the latter is to be carried out at constant current independently of speed. The switch 29 when in a braking position opens the circuit of operating coil 14 but closes the circuit of coil 15. Switch 14a is thus as shown while switch 15a is raised to its uppermost position. This reverses the polarity of exciter field winding 5b. The exciter then tends to maintain a condition in which the current through field winding 5a is also reversed but kept at a predetermined value. Regenerative braking at a controlled current is thus set up. The current is determined either directly by the booster electromotive force when motors and booster are in series or by the action of the booster on motor excitation when the motors are in parallel.

If braking be introduced during parallel connection of the motors, the motors will slow down and the booster electromotive force will increase to strengthen the motor excitation either sufficiently to maintain a substantially constant current or, if machine 10 be in circuit, to a greater extent in accordance with the decrease in speed. This goes on until the booster electromotive force reaches such a value that the control relay acts to restore the series connection. Thereafter braking can go on until the motors are brought to a standstill, and if no changes be made, the torque would, in fact, reverse the motors, to run the vehicle backwards. Means responsive to speed, such as a relay connected across machine 10 and dropping out when the voltage of this machine falls below a predetermined minimum, may interrupt the circuit established by the controller 29 when the latter is in a braking position and a very slow speed has been reached. The same means may control other circuits for introducing mechanical braking.

It will be seen that the central feature of the automatic control system is the control relay 31a operated by coils 31. This could alternatively allow the driver to operate the transfer contactors 12a and 12b when conditions are favorable but preferably the action is, as shown, entirely automatic, whereby the control by the driver is made extremely simple. The application of the invention to other forms of buck and boost control or to Ward-Leonard control will be readily understood from the foregoing.

Since numerous changes may be made in the above-described construction, and different embodiments of the invention may be made without departing from the spirit and scope thereof, it is intended that all matters contained in the foregoing description or shown in the accompanying drawing shall be interpreted as illustrative and not in a limiting sense.

We claim as our invention:

1. A motor control system comprising a direct-current motor, an external power supply, a booster set disposed to draw electrical energy from the external power supply and to buck or boost the supply to the motor, transfer switches by means of which the load formed by the motor armature can be transferred wholly to said power supply, control means for said transfer switches responsive to the electrical condition of the said motor, and a rectifying valve in series with an operating coil of the control means whereby the said means will respond to a potential difference of only one polarity.

2. A motor control system comprising a direct-current motor, an external power supply, a booster set disposed to draw electrical energy from the external power supply and to buck or boost the supply to the motor, transfer switches by means of which the load formed by the motor armature can be transferred wholly to said power supply, control means for said transfer switches responsive to the electrical condition of the said motor circuit, a rectifying valve in series with an operating coil of the control means whereby the said means will respond to a potential difference of only one polarity, and a source of biasing voltage in series with the said coil and valve and tending to send current in the direction permitted by the valve.

3. A motor control system comprising an external power supply, a booster set disposed to draw electrical energy from the external power supply, two motors with the booster armature disposed to be connected between them to buck or boost the supply to the motors, transfer switches disposed to connect junction points of the booster and the motor armatures with terminals of the said power supply, and a control relay for controlling the operation of said transfer switches, said relay having an operating coil connected across the contacts of a transfer switch.

4. A motor control system comprising an external power supply, a booster set disposed to draw electrical energy from the external power supply, two motors with the booster armature disposed to be connected between them to buck or boost the supply to the motors, transfer switches disposed to connect junction points of the booster and the motor armatures with terminals of the said power supply, a switch for disconnecting the booster from the said supply after closure of the transfer switches and a control relay for controlling the operation of said transfer and disconnecting switches, said relay having an operating coil connected across the contacts of said disconnecting switch.

5. A motor control system comprising an external power supply, a booster set disposed to draw electrical energy from the external power supply, two motors with the booster armature disposed to be connected between them to buck or boost the supply to the motors, transfer switches disposed to connect junction points of the booster and the motor armatures with terminals of the said power supply, a switch for disconnecting the booster from the said supply after closure of the transfer switches, and a control relay for controlling the operation of said transfer and disconnecting switches, said relay having an operating coil connected across a transfer switch when the transfer switch is open and across the disconnecting switch when it is open.

6. A motor control system comprising an external power supply, a booster set disposed to draw electrical energy from the external power supply, two motors with the booster armature disposed to be connected between them to buck or boost the supply to the motors, transfer switches disposed to connect junction points of the booster and the motor armatures with terminals of the said power supply, a switch for disconnecting the booster from the said supply after closure of the transfer switches, and a control relay for controlling the operation of said transfer and disconnection switches, said relay having an operating coil connected across a transfer switch when the transfer switch is open and across the disconnecting switch when it is open, the operating coil of said relay being connected between a contact of one switch and a contact of the other, a rectifying valve in series with said coil to prevent passage of current until the potential difference across the transfer switch has reached zero, and a source of biasing voltage for operating the relay when said potential difference is substantially zero.

7. A motor control system comprising an external power supply, a booster set disposed to draw electrical energy from the external power supply, two motors with the booster armature disposed to be connected between them to buck or boost the supply to the motors, transfer switches disposed to connect junction points of the booster and the motor armatures with terminals of the said power supply, a switch for disconnecting the booster from the said supply after closure of the transfer switches, and a control relay having an operating coil connected across a transfer switch when the transfer switch is open and across the disconnecting switch when it is open, said control relay being adapted to effect retransference of said connections upon a restoration of predetermined conditions.

8. A motor control system comprising an external power supply, a booster set disposed to draw electrical energy from the external power supply, two motors with the booster armature disposed to be connected betwen them to buck or boost the supply to the motors, transfer switches disposed to connect junction points of the booster and the motor armatures with terminals of the said power supply, a switch for disconnecting the booster from the said supply after closure of the transfer switches, a control relay having an operating coil connected across a transfer switch when the transfer switch is open and across the disconnecting switch when it is open, the operating coil of said relay being connected between a contact of one switch and a contact of the other, a rectifying valve in series with said coil to prevent passage of current until the potential difference across the transfer switch has reached zero, a source of biasing voltage for operating the relay when said potential difference is substantially zero, a polarizing coil on the control relay, and switching means responsive to the operation of the relay to reverse the polarity of the polarizing coil whereby a restoration of conditions producing current in the operating coil after operation of the relay to effect transfer will move the relay back to effect re-transfer.

9. A motor control system comprising an external power supply, a booster set disposed to draw electrical energy from the external power supply, two motors with the booster armature disposed to be connected between them to buck or boost the supply to the motors, transfer switches disposed to connect junction points of the booster and the motor armatures with terminals of the said power supply, a switch for disconnecting the booster from the said supply after closure of the transfer switches, a control relay having an operating coil connected across a transfer switch when the transfer switch is open and across the disconnecting switch when it is open, the operating coil of said relay being connected between a contact of one switch and a contact of the other, a rectifying valve in series with said coil to prevent passage of current until the potential difference across the transfer switch has reached zero, a source of biasing voltage for operating the relay when said potential difference is substantially zero, a polarizing coil on the control relay, and switching means responsive to the operation of the relay to reverse the polarity of the polarizing coil whereby a restoration of conditions producing current in the operating coil after operation of the relay to effect transfer will move the relay back to effect retransfer, and means for causing the reversing switch for the polarizing coil of the relay to operate with a time-lag.

10. A motor control system comprising a direct-current traction motor, an external power supply, a booster set disposed to draw electrical energy from the external power supply and to buck or boost the supply to the motor to maintain substantially a predetermined current through the traction motor armature, a master controller disposed to control closure of circuits for accelerating the traction motor, and control means for automatically transferring the load formed by the motor armature to the power supply without further movement of the master controller when the counter electro-motive force for the traction motor is substantially equal to the said power supply voltage.

11. Electric motor and control equipment comprising, in combination, a direct-current motor, an external power supply, a booster set disposed to draw electrical energy from the external power supply and to buck or boost the supply to the motor to maintain substantially a predetermined current through the traction motor armature during acceleration and regenerative braking of the motor, a separately excited field winding on the motor, means for energizing said winding as a continuous function of motor speed, means for transferring the load formed by the motor armature from the said booster to the external supply, control means for said transfer means responsive to the electrical condition of the said motor circuit, and a rectifying valve in series with an operating coil of the control means whereby the said control means will respond to a potential difference of only one polarity.

12. Electric motor and control equipment comprising, in combination, a direct-current motor, an external power supply, a booster set disposed to draw electrical energy from the external power supply and to buck or boost the supply to the motor to maintain substantially a predetermined current through the traction motor armature during acceleration and regenerative braking of the motor, a separately excited field winding on the motor, an auxiliary dynamo-electric machine driven by the motor for energizing said winding as a continuous function of motor speed, means for transferring the load formed by the motor armature from the said booster to the external supply, control means for said transfer means responsive to the electrical condition of the said motor circuit, a rectifying valve in series with an operating coil of the control means whereby the said control means will respond to a potential difference of only one polarity, and a source of biasing voltage in series with the said coil and valve and tending to send current in the direction permitted by the valve.

ERIC ALTON BINNEY.
HAROLD SINCLAIR POUND-CORNER.
HUGH BROUGHAM SEDGFIELD.